UNITED STATES PATENT OFFICE.

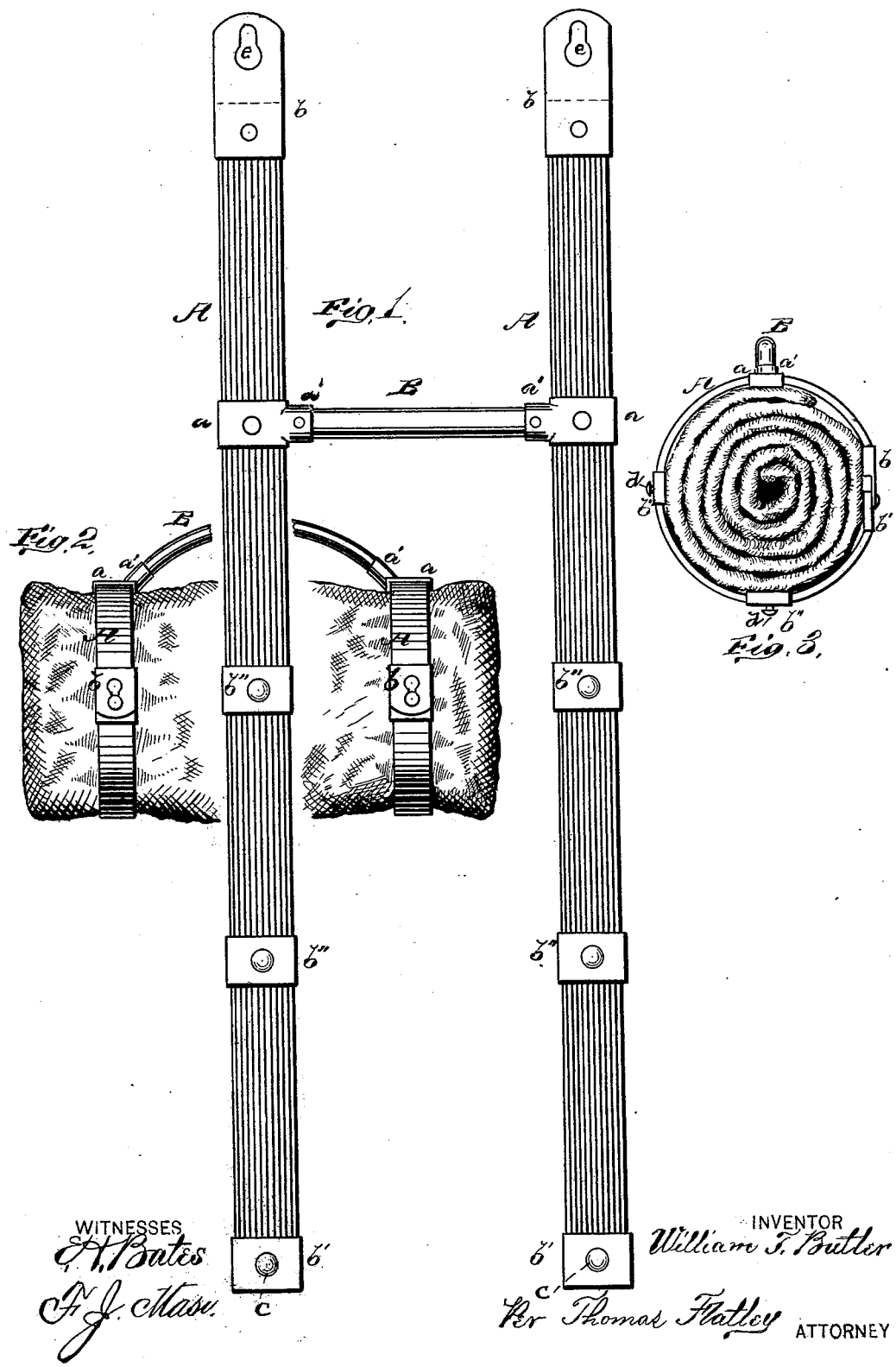

WILLIAM T. BUTLER, OF BOSTON, MASSACHUSETTS.

IMPROVEMENT IN SHAWL-STRAPS.

Specification forming part of Letters Patent No. 206,928, dated August 13, 1878; application filed January 28, 1878.

*To all whom it may concern:*

Be it known that I, WILLIAM T. BUTLER, of the city of Boston, county of Suffolk, and State of Massachusetts, have invented a new and useful Improvement in Shawl and Parcel Straps, of which the following is a specification.

This invention relates to a device for carrying shawls, parcels, and school-books; and the novelty consists of two or more elastic rubber straps or bands connected by a handle of rubber or leather, each of said straps having one or more fastenings, made of brass, nickel, or other metal, strongly cemented on, or otherwise permanently attached, in such a manner that it can be adjusted to parcels of different sizes, as will be hereinafter more fully set forth.

In the accompanying drawings, Figure 1 is a plan view of my improved shawl and parcel straps. Fig. 2 is a side view, showing the same applied to a bundle; and Fig. 3 is an end view of the same.

In the annexed drawings, wherein similar letters of reference indicate like parts, the letter A represents the rubber straps or bands, attached to the handle B by means of metallic fastening-sockets $a$ and $a'$ and rivets, or otherwise securely fastened.

Each end of the rubber straps is provided with locking-loops $b$ and $b'$, and these straps are also provided at suitable distances of their length with sleeves $b''$, having headed pins $d$, to engage with the key-hole slots $e$ of the loop $b$, to form a locking device. The loops and sleeves may be made of brass, nickel, or other metallic substance, and can be attached to the rubber straps in any of the well-known ways.

It will be noticed, by referring to the drawing, that the lower locking-loop, $b'$, is attached to the lower extreme end of the rubber bands, (and may be looped over the end, thereby protecting the same,) and is provided on its outer face with an engaging-pin, $c$, which engages with a slot, $e$, in the locking-loop $b$, attached to the upper end of the rubber band.

After the shawl or other article is folded, or the books properly adjusted, the straps are passed under and around the shawl, parcel, or books, and the locking-loops brought together to make the necessary fastening, as shown in Figs. 2 and 3 of the drawings.

The advantages of my rubber straps and their fastening devices, as distinguished from the leather straps or other inventions, are:

First, the elasticity of the rubber, which automatically adjusts itself to the parcel.

Second, they are more easily fastened than the commonly-used leather straps, needing less physical exertion and requiring less time for that purpose.

Third, the straps, being made of rubber bands, can be easily applied and adjusted to large and small parcels without injuring the contents, owing to the various adjustments and the elasticity of the rubber bands.

Fourth, in carrying books, no matter how great soever the strain, the rubber straps will not break or injure the edges of the books like the ordinary leather straps.

I do not claim, broadly, the use of rubber straps, since a continuous rubber strap is shown in the patent granted July 22, 1873, to F. H. Willis.

What I claim as my invention is—

1. A device for carrying parcels or books, having two or more elastic rubber straps provided with fastening devices, substantially as described.

2. A device for carrying parcels or books, consisting of two or more elastic straps, A A, handle B, and the fastening devices, substantially as described.

WILLIAM T. BUTLER.

Witnesses:
HORACE G. LIPPINCOTT,
THOMAS J. CONEELY.